United States Patent [19]

Stevenson et al.

[11] Patent Number: 4,609,336
[45] Date of Patent: Sep. 2, 1986

[54] APPARATUS AND METHOD FOR EXTRUSION

[75] Inventors: James F. Stevenson, Hudson; Thomas E. Codispoti; Richard M. Griffith, both of Akron; Harry L. Hutch, Stow, all of Ohio

[73] Assignee: GenCorp Inc., Akron, Ohio

[21] Appl. No.: 661,635

[22] Filed: Oct. 17, 1984

[51] Int. Cl.⁴ .................. B29C 47/92; B29C 49/78
[52] U.S. Cl. ..................... 425/135; 156/494; 226/44; 226/113; 242/75.3; 242/75.5; 242/75.51; 425/377
[58] Field of Search ............ 242/75.1, 75.5, 75.3, 242/75.51; 425/135, 377; 264/40.1, 40.7; 156/494; 226/44, 113

[56] References Cited

U.S. PATENT DOCUMENTS

| 2,512,844 | 6/1950 | Weber | 425/377 |
|---|---|---|---|
| 2,566,854 | 9/1951 | Rhodes | 425/135 |
| 2,760,734 | 8/1956 | Hornberger | 242/75.5 |
| 2,847,703 | 8/1958 | Schrenk et al. | 425/66 |
| 2,934,987 | 5/1960 | Rauline | 226/44 |
| 3,051,362 | 8/1962 | Shook | 226/44 |
| 3,054,499 | 9/1962 | Petix et al. | 198/815 |
| 3,395,200 | 7/1968 | Mader et al. | 425/135 |
| 3,515,327 | 6/1970 | Bortmas | 226/113 |
| 3,551,545 | 12/1970 | Overdiep | 425/377 |
| 3,650,490 | 3/1972 | Saunders | 242/75.5 |
| 3,850,729 | 11/1974 | Paulson et al. | 156/494 |
| 3,870,214 | 3/1975 | Schmid | 226/44 |
| 3,904,338 | 9/1975 | Straumanis | 264/40.7 |
| 4,033,451 | 7/1977 | Kelsall | 198/815 |
| 4,097,566 | 6/1978 | Bertin et al. | 264/40.7 |
| 4,112,031 | 9/1978 | Gohlisch | 264/347 |
| 4,129,632 | 12/1978 | Olson et al. | 264/40.1 |
| 4,162,051 | 7/1979 | Doby | 242/75.5 |
| 4,226,818 | 10/1980 | Brower et al. | 264/40.1 |

FOREIGN PATENT DOCUMENTS

840380  7/1960  United Kingdom ............... 242/75.5

Primary Examiner—Willard E. Hoag
Attorney, Agent, or Firm—44329

[57] ABSTRACT

A rotatable accumulator roll which may move substantially horizontally or vertically is disposed between the die of an extruder and a take-away conveyor to minimize the effects of output surging of the extrudate from the die of the extruder in order to maintain substantially the dimension of the extrudate as delivered to a constant speed take-away conveyor. Variable force is applied to the roll to maintain tension on the extrudate.

7 Claims, 11 Drawing Figures

APPARATUS AND METHOD FOR EXTRUSION

This invention relates to a method and apparatus for controlling short term output variation during the extrusion of rubbery compositions.

Extrusion processes lend themselves to continuous operation at constant rates. However, most extruders can be characterized by some variation in output. Among the causes of the variation can be stick/slip flow at interfaces, cycling of the temperature controller, irregularities in the feed rate, solid bed break up, fluctuations in the screw speed drive, batch-to-batch and within batch variations in the rubbery material delivered to the extruder and so forth. These variations can result in surges from the extruder. If the take-away conveyor is run at a constant speed, then these surges produce dimensional variation such as ripples in the extrudate on the take-away conveyor.

An object of this invention is to provide an apparatus and method to substantially overcome the effects of surges from the extruder in order to substantially maintain constant the dimensions of the extrudate delivered to the take-away conveyor.

These and other objects and advantages of the present invention will become more apparent to those skilled in the art from the following detailed description and accompanying drawings in which:

STATEMENT OF THE INVENTION

According to the present invention it has been found that by having a movable and rotatable accumulator roll positioned between the die of an extruder and a take-away conveyor, it is possible to minimize the effects of surges or variations in output from the die and thereby to maintain substantially the dimensions of the extrudate as extruded from the die. In the short term the position of the roll is adjusted naturally in the proper direction and distance by the extrudate to maintain an approximate balance between tension in the extrusion line and the external force applied to the accumulator roll. A sophisticated control system could also compensate for the influence of inertia, friction, and roll position on the relation between line tension and external force. Over longer periods of time it may be necessary to adjust the level of the external force applied to the accumulator roll to compensate for changes in material properties or operating conditions.

Without the accumulator too much or too little extrudate delivered to the conveyor due to surges from the extruder causes the extrudate to be thickened in certain areas or thinned in others and thus be out of specification limits. By means of the present invention the changes in dimensions of the extrudate caused by variations or surges from the extruder in output from the die are minimized or substantially eliminated.

DISCUSSION OF DETAILS

Figure 1:
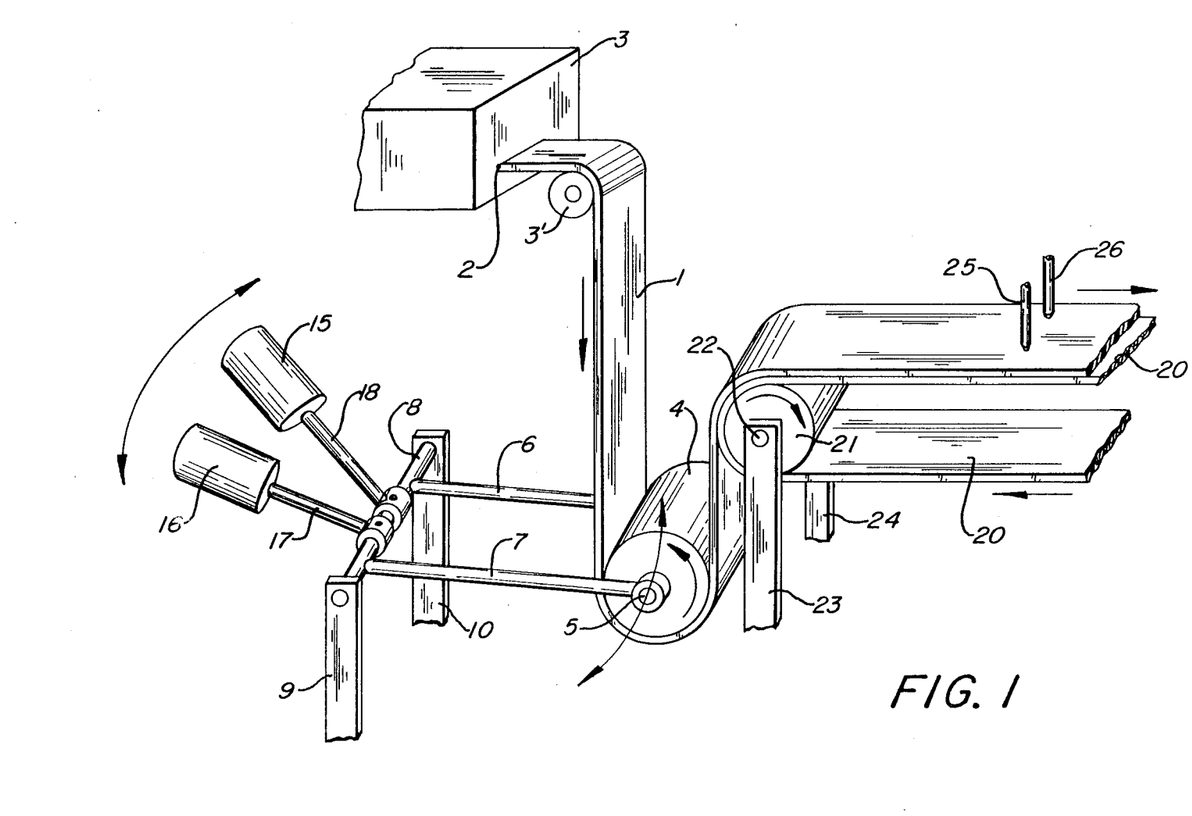
FIG. 1 is a fragmentary perspective view of an arrangement of apparatus for carrying out the method of the present invention.

In FIG. 1 hot rubbery extrudate strip 1 is shown being extruded from die 2 of extruder 3. The extrudate passes over guide roll 3' and around rotating arcuately and vertically movable accumulator roll 4. The accumulator roll is mounted for rotation about its axis on shaft 5 which is connected to arms 6 and 7 attached to bar 8 which can pivot or rotate in supports or bearings 9 and 10. Counter weights 15 and 16, which can be independently adjusted to make the tension in strip 1 relatively independent of the position of the accumulator roll, are attached to bar 8 by arms 17 and 18. Extrudate 1 is drawn away at constant speed by caterpillar or endless take-away conveyor (belt) 20 which passes around fixed rotating roll 21 which rotates on shaft 22 carried by fixed supports or bearings 23 and 24. LVDTs (linear variable differential transformers, Schaevitz Engineering) 25 and 26 are mounted above extrudate 1 on conveyor 20 to measure the thickness of extrudate 1.

Figure 2:
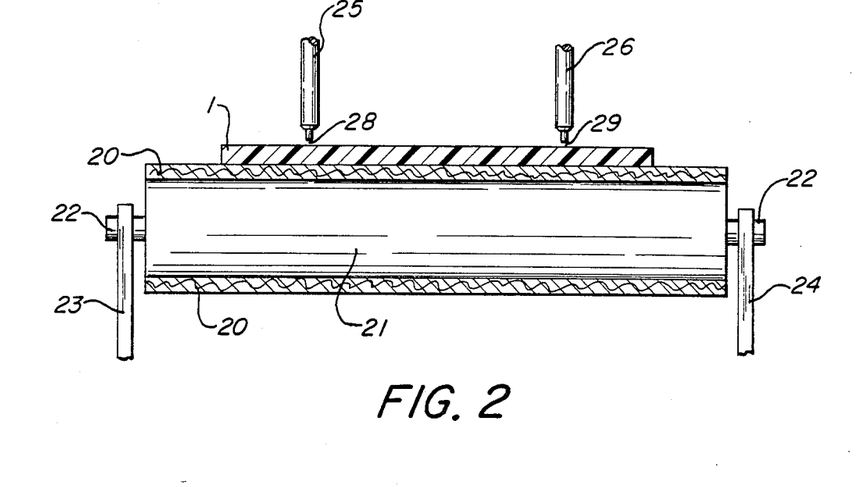
FIG. 2 is a vertical partially cross-sectional view of the take-away conveyor carrying the extrudate where the extrudate thickness is being measured.

In FIG. 2 there is shown extrudate 1 from accumulator 4 being carried by endless conveyor 20 on rotating roll 21 mounted on shaft 22 held by fixed supports 23 and 24. LVDTs 25 and 26 are positioned to measure the thickness variations of extrudate 1. Alternatively, a rotating roll can be positioned between conveyor 20 and extrudate 1 directly beneath LVDTs 25 and 26 to support extrudate 1 and to allow a more accurate measurement of the thickness of extrudate 1.

Figure 3:
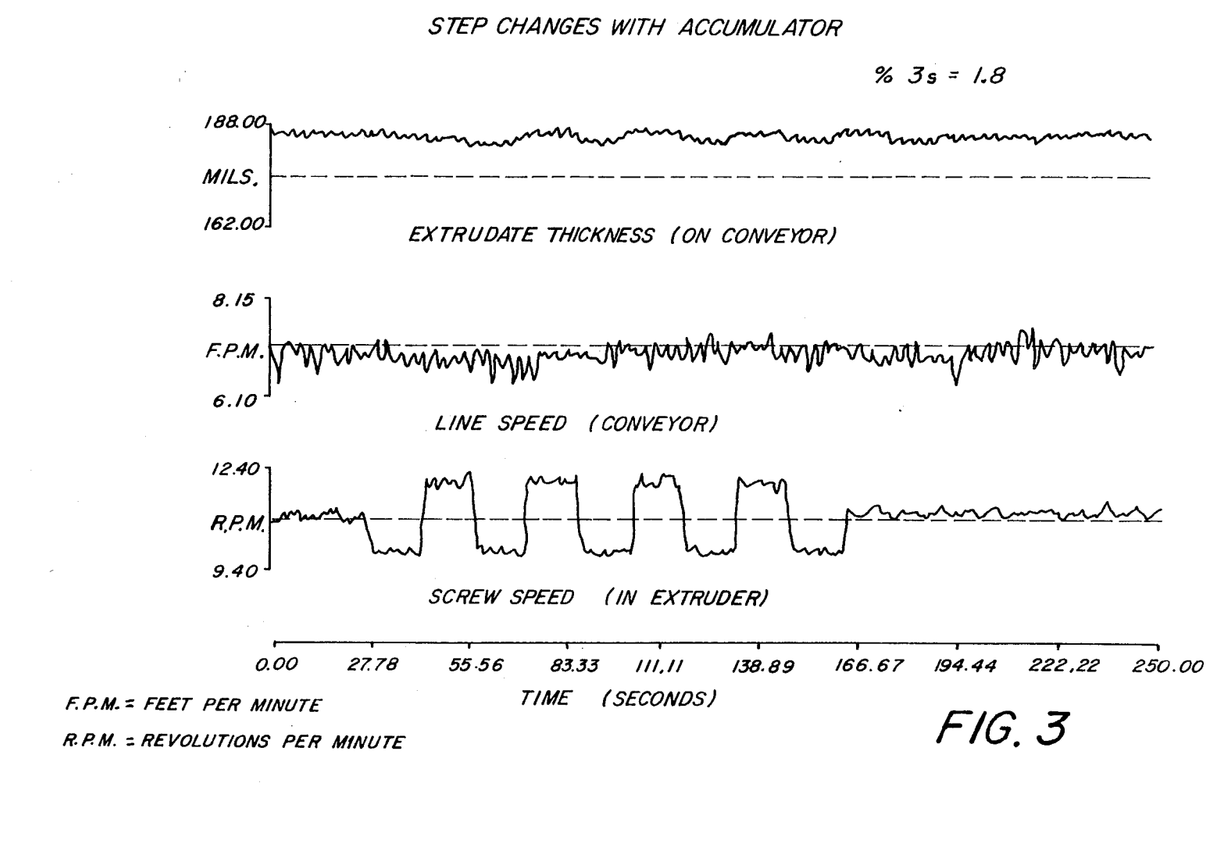
FIG. 3 is a graph showing the results obtained during an extrusion using the apparatus of the present invention.
Figure 4:
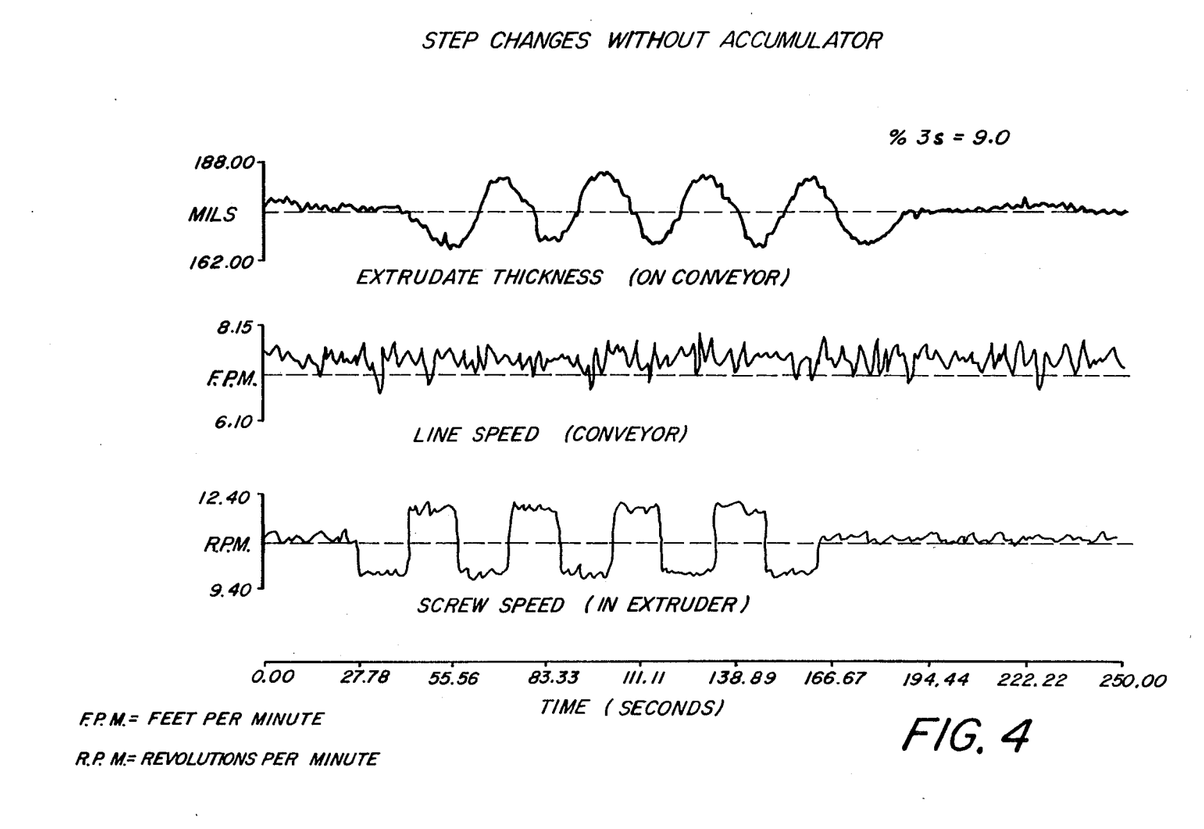
FIG. 4 is a graph showing the results obtained during an extrusion without the apparatus of the present invention.

Data on the operation of an extrusion line using the concept of FIGS. 1 and 2 are shown by FIG. 3 and FIG. 4. The extruder used was a Monsanto 3 ½" cold feed extruder. The feed was a compounded, rubbery tire tread composition and was extruded through a slit die 3" wide×0.125" thick on the end of the extruder. The accumulator was a lightweight aluminum roll. Data were collected using a MACSYM 350 computer at a rate of 1 set per second. To simulate surging in the output of the extruder, the extruder screw speed was varied by ±10% from its average value in a square wave pattern with a period of 30 sec. The take-away belt speed was maintained constant. The accumulator maintained a nearly constant tension on the extrudate as it left the die and lengthened or shortened the distance between the die and the take-away conveyor to overcome surges or variations in the extrusion rate. This lengthening and shortening dampened out the increasing and decreasing dimensions at the die so that the dimensions of the extrudate at the conveyor were much more uniform. The accumulator must be designed so that its stroke is sufficient to accommodate all the excess material during a surge and vice versa during the low output portion of the cycle.

FIG. 3 shows the results of a step change in screw speed (simulating a surge) of the extruder while using accumulator 4. The accumulator's weights 15 and 16 were positioned to produce a tension of approximately one pound. The screw speed was varied ±1.1 rpm from the mean at 15 sec-intervals for a total of four and one-half cycles. The accumulator responded to the changes (surges) in extruder output and maintained a relatively constant tension resulting in little change in the extrudate thickness as shown by the data in FIG. 3. The same run was repeated with the same screw speed variation, but this time accumulator 4 was bypassed. FIG. 4 shows the change in thickness resulting from the change in the extruder output when accumulator 4 was not used. Three times the coefficient of variation expressed as a percentage (3×100×std. dev./mean) for the thickness was reduced from 9.0% to 1.8% when accumulator 4 was used.

In FIG. 1 the relation between the tension in the extrudate, the weight of the accumulator roll 4, the geometry of the counterbalance mechanism 6, 7, 15, 16, 17 and 18, and the position of the accumulator roll is complex. In general, the geometry of the counterbalance system 15, 16, 17 and 18 can be designed so as to minimize the variation in tension resulting from movement of the accumulator. Instead of two weights, the counterbalance weight could have a camlike geometry.

Figure 5:
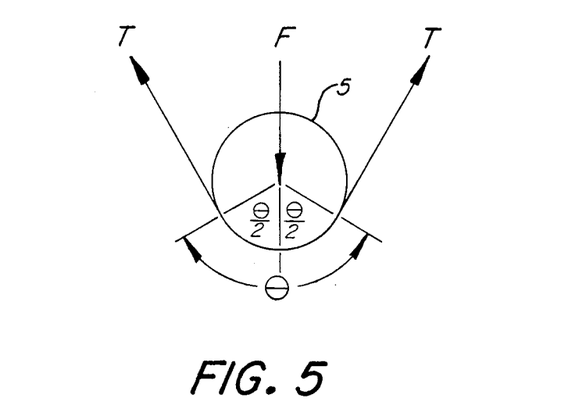
FIG. 5 is a diagram showing the forces operating on the accumulator roll.

A simple example of this relationship is shown in FIG. 5 where the tension T in both ends of the extrudate is assumed equal and the net vertical force F exerted by the weight of the roll 5 and the counterbalance system is assumed to bisect the wrap angle $\theta$. Since the die and conveyor locations are fixed, the wrap angle $\theta$ changes as the position of the roll changes. With neglect of the horizontal motion of the roll, the force F must be varied according to the following expression to maintain the tension T constant as the position of the accumulator, and hence the wrap angle $\theta$, changes:

$$F(\theta) = 2T \sin(\theta/2).$$

In addition, a means is needed to adjust the tension in the extrudate to compensate for changes in material properties within a run. Otherwise the accumulator may eventually move to one of its extreme positions and stay there. These adjustments are made by a slow acting feed back system which manipulates the counterbalance weight so that the motion of the accumulator is centered in the middle of the operating range. These adjustments can also be made by the motor-magnetic clutch assembly shown in FIG. 9. See, also, FIGS. 6 and 8.

Figure 6:
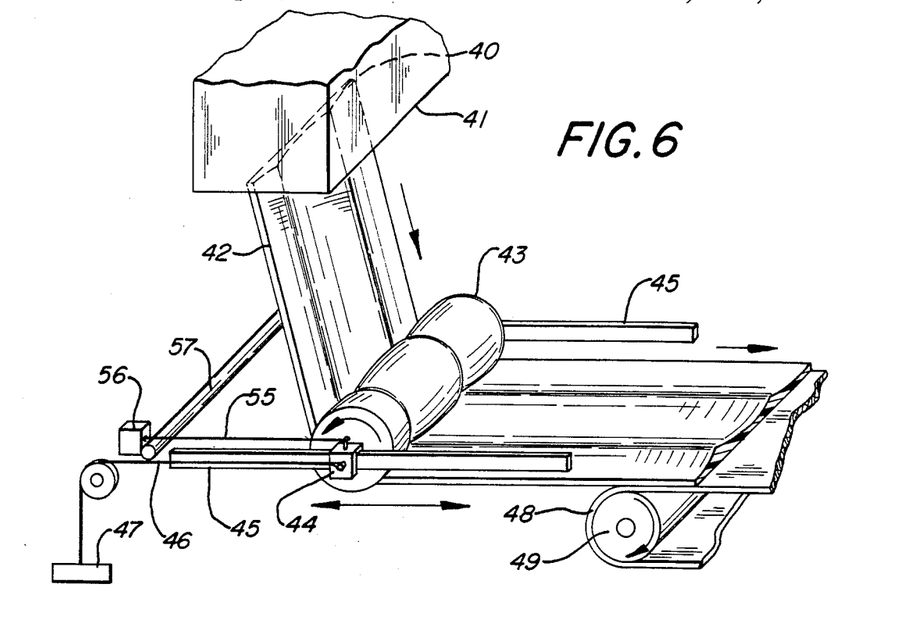
FIG. 6 is a fragmentary perspective view of another arrangement of apparatus for carrying out the method of the present invention using a rotating accumulator which is mounted on guide rails or slides.
Figure 7:
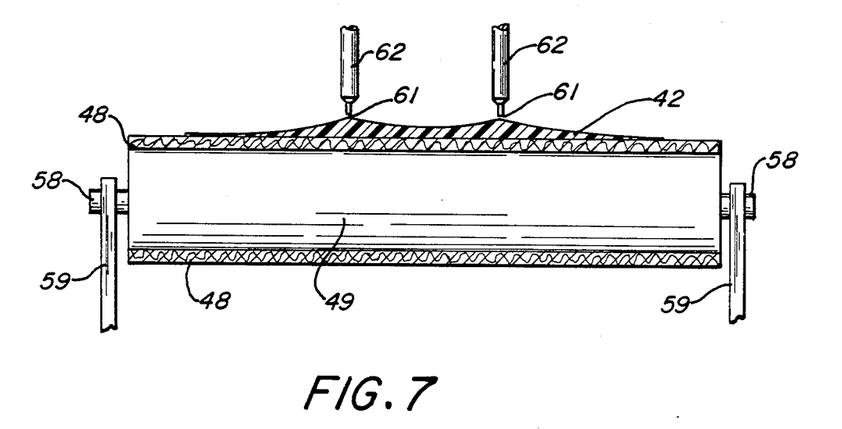
FIG. 7 is vertical partially cross-sectional view of the take-away conveyor carrying an extrudate extruded in the shape of a tire tread cap and where the tops of the extrudate are being measured.
Figure 8:
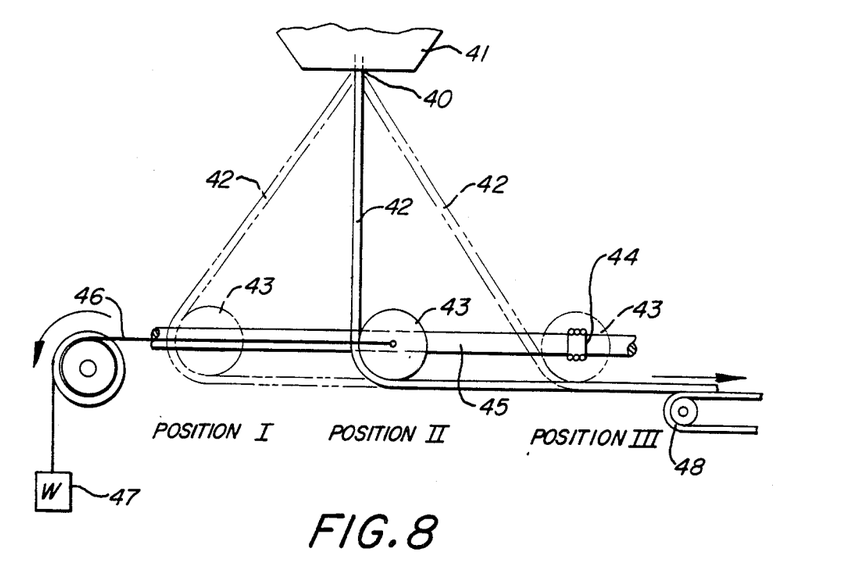
FIG. 8 is a vertical diagram illustrating how the accumulator roll moves in the slide to accommodate surges or variations in extrudate from the die of the extruder.

Another embodiment of the invention is shown in FIGS. 6 to 8. In FIG. 6 a hot rubbery composition in the shape of a tire tread is extruded through die 40 of extruder 41 to form extrudate 42 which passes under rotating contoured (to match the tread surface) accumulator roll 43. The accumulator roll is mounted on a shaft connected to linear bearings 44 which ride and reciprocate horizontally on parallel guide rails or tracks 45 (the slide). Tension or force is applied to accumulator roll 43 by cable 46 attached at one end to bearing 44 and at the other end to weight 47 which may be varied. A similar cable and weight system is located on the opposite side of the accumulator and is not visible in FIG. 6. Extrudate 42 passes around accumulator roll 43 and to endless take-away conveyor 48 carried by roll 49. The take-away conveyor applies tension in the opposite direction. Wire 55 is attached at one end to bearing 44 and is attached at the other end to position/displacement transducer 56 (Celesco, Transducer Products, Inc.) mounted on frame member 57. Movement of bearin 44 of accumulator roll 43 generates a voltage in transducer wnich gives a measure of the position of accumulator roll 43 in slide 45.

In FIG. 7 extrudate 42 is shown on conveyor 48 carried by roll 49 which rotates on shaft 58 carried by bearings or supports 59, 59. Mounted above shoulders 61, 61 of extrudate 42 are LVDTs 62, 62 to measure the thickness of the tread at these top positions. These shoulders will become the shoulders of a tire when the extrudate is cut and placed in position on a tire carcass during tire building.

FIG. 8 shows how accumulator roll 43 operates in slide 45 on variations in flow of extrudate 42 from extruder 41 due to surges in extruder 41, for example, by taking different positions I, II or III.

With respect to FIG. 8 the accumulator dampens out surges in the extruder output by the following mechanism:

Assume that the extruder output is momentarily at the desired level and movable roll 43 is centered at position II in FIG. 8.

Then an increase (surge) in output begins and lasts for approximately 30 seconds. Since the line speed of conveyor 48 is essentially constant, the surge will reduce the line tension caused by conveyor 48. The imbalance between the line tension and cable tension or force, 46, will cause roll 43 to move back toward position I of FIG. 8 as long as the output rate is elevated. This backward motion of roll 43 increases the line length (the material inventory of extrudate between the die and the conveyor), thereby dampening out the effect of the surge on extrudate 42 at take-away conveyor 48. When the output rate returns to normal, the imbalance between the cable tension (46) and line tension (48) goes to zero and the backward motion of roll 43 stops.

Since the feed rate to hot feed extruders is very nearly constant in the short run, the surge in output must be followed by a period of decreased output rate. The lower output rate causes an increase in the line tension (48) and now the imbalance between line (48) and cable (46) tensions causes roll 43 to move forward toward position III of FIG. 8. The reduced output rate will be compensated by the shortening of the line length and the depletion of inventory. Once the output rate has returned to normal, the motion of roll 43 will stop. When the next surge starts, the cycle will repeat.

Figure 9:
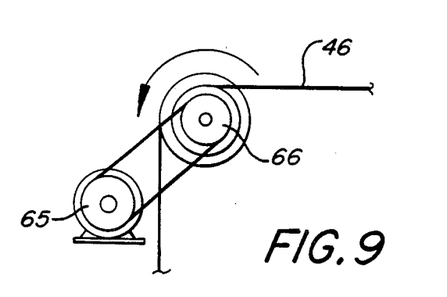
FIG. 9 is a partial vertical diagram illustrating another piece of apparatus which can be used to control the force on the accumulator roll of FIG. 8.

FIG. 9 shows that weight 47 may be replaced with an electromechanical or motor-magnetic clutch assembly 65 wherein the motor is coupled to cable drum shaft 66 through a magnetic clutch which allows the amount of torque transmitted from the motor to the shaft to be accurately controlled by the clutch controller to vary the force on roll 43 and resulting tension on extrudate 42. Magnetic clutch assembly 65 could also be used in place of the counterweights shown in FIG. 1. The magnetic clutch assembly allows more sophisticated control of the mbtion of the accumulator roll. The force exerted by tension in tread 42 can be sensed by a force transducer of accumulator roll 43. This force measurement is not influenced by inertia or friction since it is made on the movable accumulator roll. With knowledge of the position of accumulator roll 43, the tension in the line (extrudate 42) can be calculated from the transducer measurement and this tension can be maintained at a specified value by manipulating the magnetic clutch.

Figure 10:
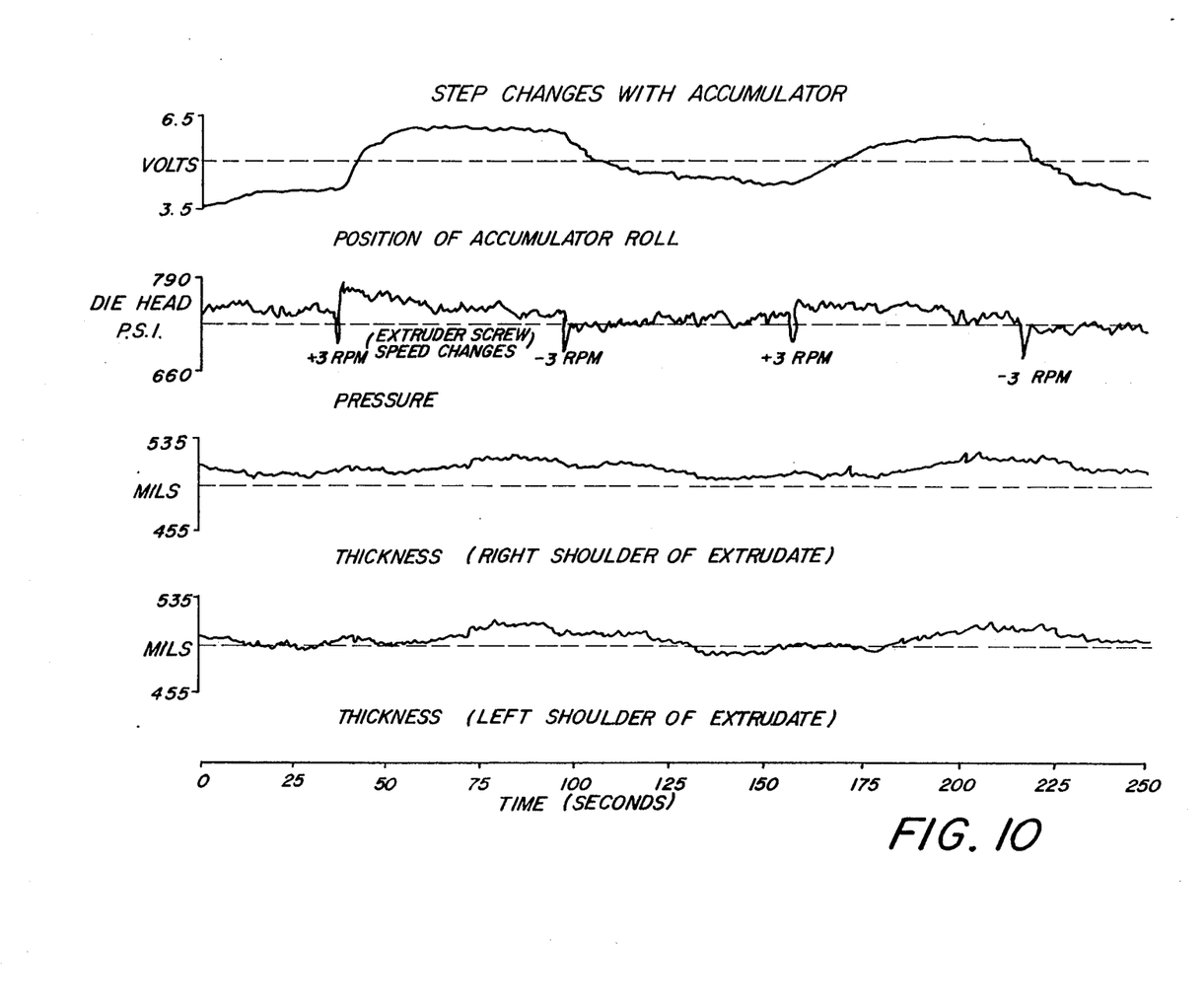
FIG. 10 is a graph showing the results obtained during an extrusion using the accumulator of FIG. 6
Figure 11:
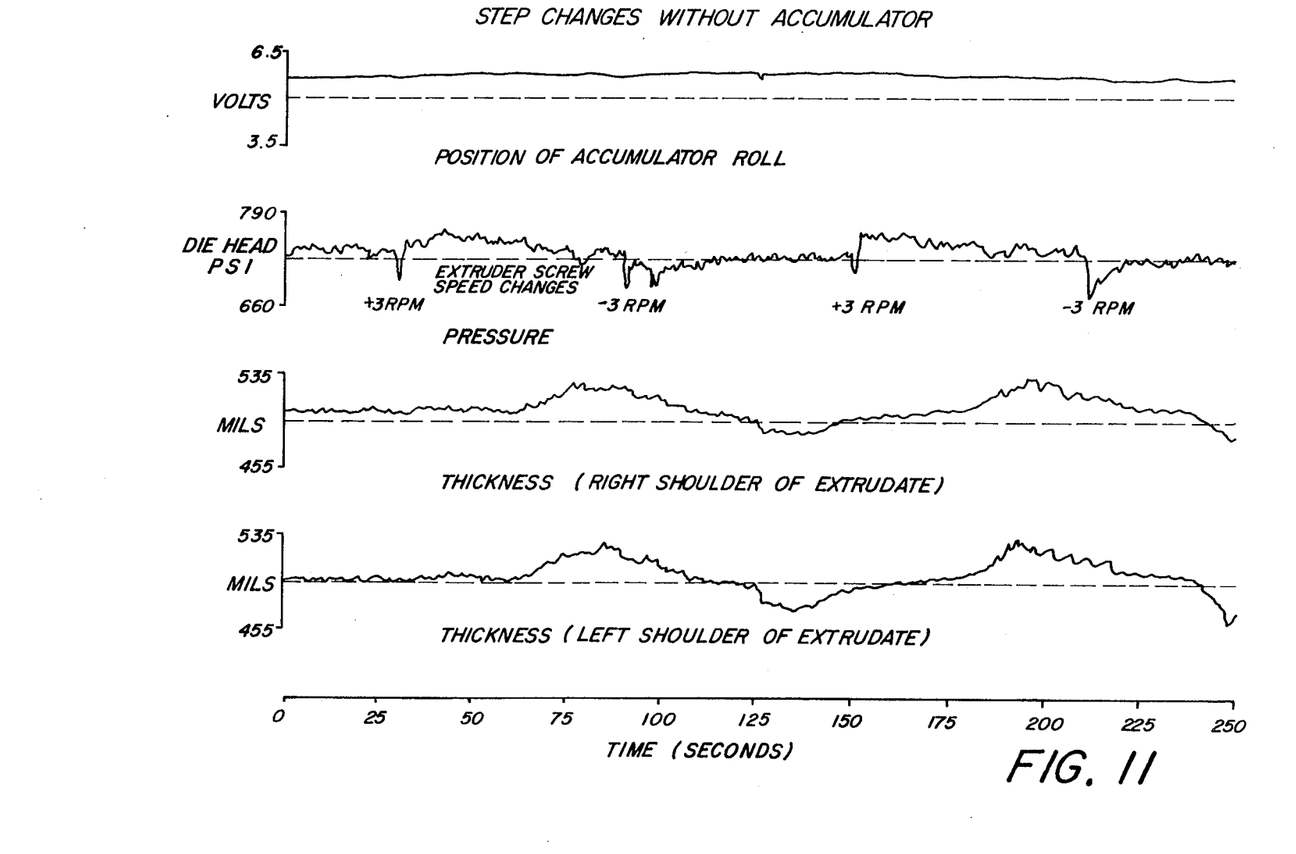
FIG. 11 is a graph showing the results obtained during an extrusion without using the accumulator of FIG. 6.

FIG. 10 and FIG. 11 show the data obtained on a test involving the general apparatus set-up of FIGS. 6 to 8. As seen from the data, the thicknesses of the shoulders showed smaller variations when the accumulator roll was used, FIG. 10, as compared to FIG. 11 when the accumulator roll was not used. Changes in extruder screw speed indicated by + or −3 rpm were made to simulate surges in the extruder.

The rubbery material used in the practice of the present invention can be a rubber such as natural rubber, deresinated guayule, synthetic solvent or emulsion polymerized polymers and copolymers such as the polyisoprenes, the polybutadienes, butadiene-styrene copolymers, butadiene-acrylonitrile copolymers, butyl rubber, bromobutyl rubber, chlorobutyl rubber, polychloroprenes, ethylene-propylene copolymers, ethylene-propylene-non conjugated diene copolymers, thermoplastic rubbers and so forth. Random, block and graft polymers can be used. Blends or mixtures of polymers can be used. Still other rubbery materials may be used such as the acrylic polymers, polyisobutylenes, ethylene-vinyl acetate copolymers, epichlorohydrin polymers and polyurethanes. These rubbery materials should contain the usual compounding ingredients such as curing agents like sulfur or peroxides, other cross-linking compounds, reinforcing pigments like carbon black and silica, clay, color pigments like $TiO_2$, oils or plasticizers, accelerators, zinc oxide, stearic acid, zinc stearate, antioxidants, UV absorbers, waxes and so forth. Extrusion shrinkage may be observed with any of these materials. Still other polymers and copolymers may be used which become rubbery or viscoelastic on heating or milling such as plasticized vinyl chloride polymers and copolymers, chlorosulfonated polyethylene and so forth. These latter materials may also require stabilizers, plasticizers and so forth. It is preferred to use in the practice of this invention natural rubber, medium to high vinyl SBRs, high trans SBR, cispolyisoprene, cispolybutadiene, solution SBRs or emulsion SBRs and mixtures thereof.

The rubbery materials and compounding agents are mixed in a Banbury or other internal mixer or on a rubber mill at a temperature below vulcanization temperature. The hot (warm) compounded rubbery composition from the Banbury or mill is then delivered to the hopper of the extruder, preferably the rubbery composition from the Banbury or mill first is passed through a calender or warm-up rolls and then to the hopper of the extruder.

While the method and apparatus of this invention have particular use in the extrusion of rubbery compositions for treads for tires, it will be appreciated that the method and apparatus of the present invention can be used in the extrusion of rubbery materials for sidewalls, cushion stock, liners and so forth for tires and for other products such as gaskets, shoe soling and so forth.

We claim:

1. An extrusion line having an extruder with a die for extruding a hot rubbery extrudate and a take-away conveyor to receive said extrudate from said die at a constant take-away speed, a controlled counterbalanced movable accumulator roll positioned directy between said die and said take-away conveyor for receiving said extrudate from said die, said accumulator adapted to move in the region between said die and said conveyor in response to variations in output of said extrudate from said die due to surges in said extruder, and to retract or extend said extrudate to compensate for the variable output from said die in order to provide a substantially constant rate of delivery of said extrudate to said conveyor and to maintain the dimensions of said extrudate as measured on said conveyor at nearly constant values, said accumulator roll being mounted on a shaft with linear bearings riding in parallel guide rails for horizontal reciprocation and wherein said bearings are connected to means to counterbalance the long-time-average horizontal component of the tension imparted to the accumulator roll by the extrudate.

2. An extrusion line according to claim 1 wherein said bearings are connected to an adjustable weight to counterbalance the long-time-average horizontal component of the tension imparted to the accumulator roll by the extrudate.

3. An extrusion line according to claim 1 wherein said bearings are connected to motor-magnetic clutch means in order to provide an adjustable force to counterbalance the long-time-average horizontal component of the tension imparted to the accumulator roll by the extrudate.

4. An extrusion line according to claim 3 having force transducers connected to the accumulator roll for measuring tension in the extrudate and means for actuating the magnetic clutch to minimize the influence of inertia, roll position and static and kinetic friction on operation of the accumulator roll.

5. An extrusion line according to claim 4 in which said accumulator roll is a contoured roll having a surface approximately matching one surface of said extrudate.

6. The method which comprises extruding a hot rubbery composition from the die of an extruder to provide an extrudate of predetermined thickness, delivering said extrudate to a rotatable counterbalanced accumulator roll movable substantially horizontally in response to surges or short-term variations in the rate of output of said extrudate from said die of said extruder, varying as required the force on said roll in order to change the long-time-averaged tension on said extrudate in response to material property changes and to maintain constant the tension in said extrudate independent of the position of the accumulator roll and delivering said extrudate with substantially constant dimensions to a take-away conveyor.

7. The method according to claim 6 wherein said accumulator roll is connected to a motor-magnetic clutch means to provide an adjustable force and wherein the influence of inertia, static and kinetic friction, and roll position on accumulator operation are minimized by measuring the tension in the extension line through the use of force transducers on the accumulator roll and manipulating the magnetic clutch to maintain said tension at a specified value.

* * * * *